May 16, 1939.　　　　J. D. STACY　　　　2,158,868
ELECTRIC EQUIPMENT
Filed Oct. 17, 1936　　　2 Sheets-Sheet 1

Inventor:
John D. Stacy,
by Harry E. Dunham
His Attorney.

May 16, 1939.  J. D. STACY  2,158,868

ELECTRIC EQUIPMENT

Filed Oct. 17, 1936  2 Sheets-Sheet 2

Inventor:
John D. Stacy,
by Harry E. Dunham
His Attorney.

Patented May 16, 1939

2,158,868

UNITED STATES PATENT OFFICE 2,158,868

ELECTRIC EQUIPMENT

John D. Stacy, Pittsfield, Mass., assignor to General Electric Company, a corporation of New York Application October 17, 1936, Serial No. 106,181

2 Claims. (Cl. 175—41)

The present invention relates to electric equipment, more particularly of the type embodying electric condensers, or capacitors, and like electric apparatus adapted to be cooled by circulation of air over the body thereof, and an important object of the invention is the provision of improved means for insuring adequate cooling of such apparatus by means of air streams while at the same time providing protection of the insulating bushings, live terminals and connections of the apparatus from contamination by dust, moisture, insects and other debris.

A more specific object of the invention is the provision of an improved weather-proof housing for outdoor installation of electric apparatus, such for example as electric condensers, or capacitors, and the like, which is economical to manufacture, simple and sturdy in design, and effective to protect the apparatus from adverse weather and atmospheric conditions.

For an understanding of other objects of the invention and of that which I believe to be novel and my invention, attention is directed to the following detailed description and the claims appended thereto, taken in conjunction with the accompanying drawings in which an exemplary embodiment of the invention is illustrated as incorporated in a capacitor equipment suitable for outdoor installation.

Figure 1:
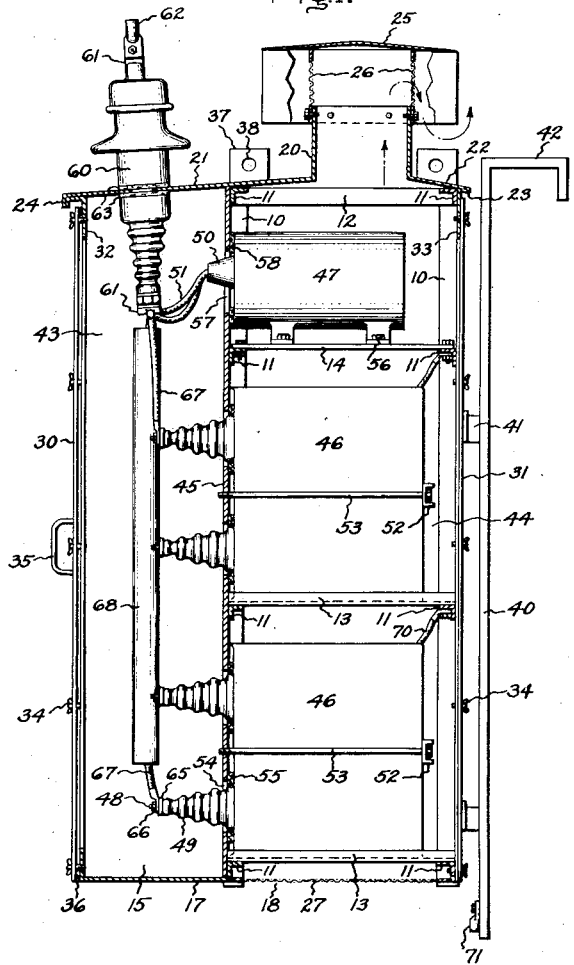
Figure 2:
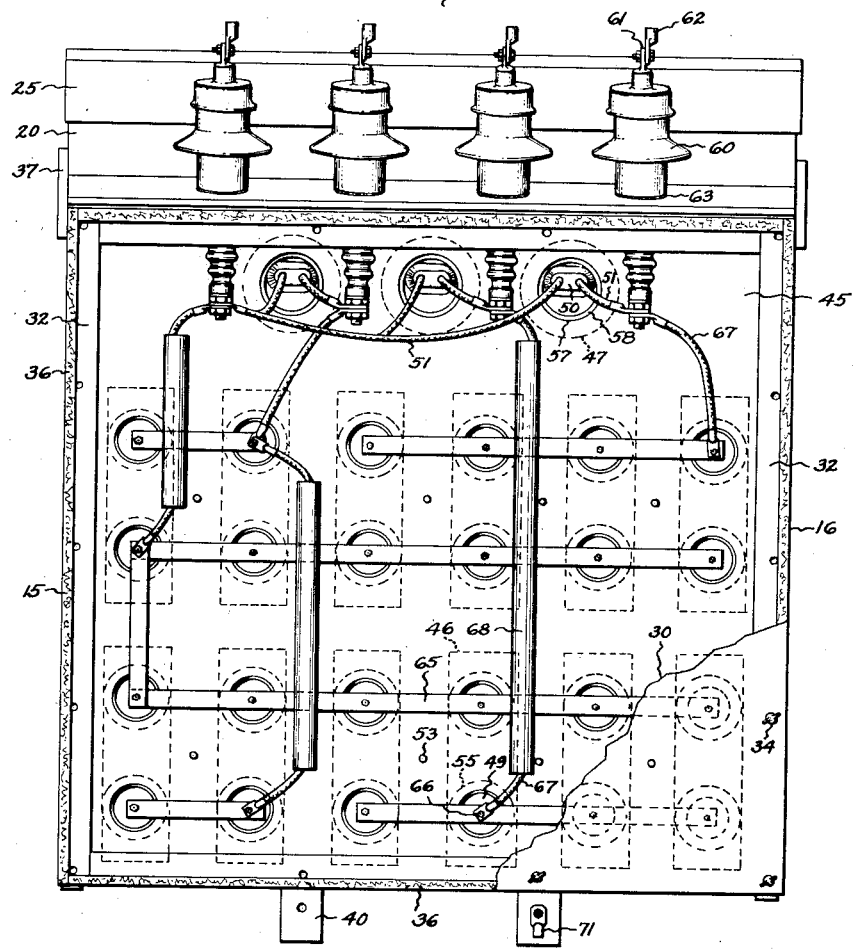
Figure 3:
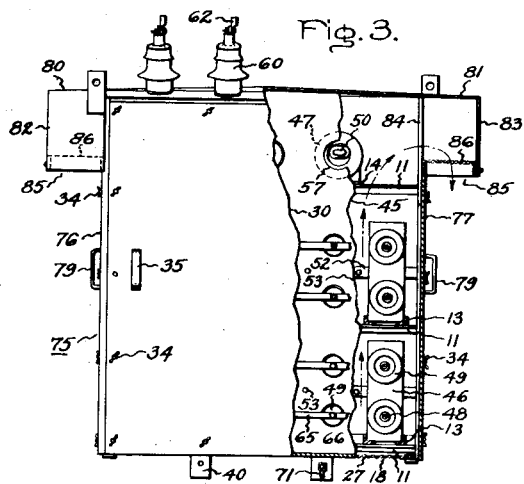

In the drawings, Fig. 1 is a side view of an outdoor capacitor equipment embodying the present invention and adapted to be supported from a pole and cross arm structure, with a side of the housing of the equipment removed to show the interior construction thereof and the manner of assembling a plurality of capacitor units and other electric apparatus and connections therein; Fig. 2 is a front view of the equipment with the front cover of the housing partially cut away to show the capacitor unit terminals and an illustrative form of electric connections thereto; and Fig. 3 is a front view, partially cut away, illustrating certain modifications in the construction of the housing.

As an example of one way in which a compact, sturdy, rigid and weather-proof box-like housing may be constructed for enclosing a capacitor and other electric apparatus incorporated in an equipment embodying the present invention, there is illustrated in the drawings a housing having a basic structural framework substantially rectangular in shape and having sheet metal plates secured to the framework to provide the walls, top and bottom of the housing. The basic framework comprises four angle iron upright members 10 disposed substantially at the four corners of a rectangle and rigidly braced apart by means of substantially horizontally extending angle iron cross members. Certain of the cross members, designated 11, are arranged in pairs disposed at different levels in the framework and extending from side to side thereof with the individual members of each pair disposed respectively at the front and rear of the framework. Another pair of the cross members, designated 12 (only one of which is shown), extend from front to rear of the framework adjacent the top thereof with the individual members of the pair respectively at opposite sides of the framework. A plurality of the cross members, designated 13, extend between and are secured to the cross members 11 respectively disposed at two different levels while a further plurality of the cross members, designated 14, which need not be in the form of angle irons, extend between and are secured to the cross members 11 on a third level of the framework.

In the form of housing illustrated in Figs. 1 and 2, the side walls of the housing comprise sheet metal plates 15 and 16 secured respectively to opposite sides of the framework with the rear edges thereof substantially flush with the rear edges of the framework while portions of the plates extend a considerable distance beyond the front edges of the framework as best shown in Fig. 1. At the bottom of the housing is a plate 17 secured to the framework and to the bottom edges of the side plates with the front edge of the bottom plate substantially flush with the front edges of the side plates 15 and 16 while the rear of the bottom plate extends only a short distance to the rear of the front edge of the framework to thereby leave open the bottom of the housing immediately beneath the framework as indicated at 18.

The top or roof of the housing also is formed of sheet metal and is secured to the top of the framework and to the upper edges of the side wall plates 15 and 16. It is provided with an upwardly extending duct 20 disposed directly over the framework toward the rear of the housing and has also portions 21 and 22 slanting from the base of the duct respectively toward the front and rear of the housing to facilitate the drainage of water therefrom. The rear portion 22 of the roof extends somewhat beyond the rear of the framework as shown at 23 while the front portion 21 of the roof extends beyond the front edges of the side wall plates and is turned down as indicated at 24. These outwardly extending or overhanging portions 23 and 24 of the roof provide eaves for preventing drainage of water directly down the rear and front of the housing. A hood 25 is mounted on the top of duct 20 and spaced upwardly therefrom in such manner as to shield the duct against the entrance of rain, sleet, snow and the like thereinto while at the same time providing for circulation of air upwardly out of the duct into the body of the hood and thence downwardly and outwardly underneath the skirt of the hood as indicated by the arrows in Fig. 1. Screens 26 are provided in the space between the upper end of the duct and the top of the hood so as to prevent entrance of insects therethrough into the housing. Screens 27 also are provided over the open portion 18 of the bottom of the housing for a similar purpose.

In order to provide for easy access to the interior of the housing, the front and rear walls thereof are made in the form of sheet metal panels or doors 30 and 31 which are adapted to be removably secured respectively to fixed flanges or rims 32 and 33 provided at the front and rear respectively of the housing. Flange 32 is secured rigidly to the overhanging roof portion 24, the front edge of bottom plate 17 and the front edges of side wall plates 15 and 16 while flange 33 is secured to the rear overhanging roof portion 23, the rear edges of side wall plates 15 and 16 and also to the rear of the framework. Wing screws 34 which engage the flanges 32 and 33 are provided for holding the panels 30 and 31 respectively in place and front panel 30 is provided with handles 35 for aid in mounting or removing the same. When the front panel is mounted, a sealing gasket 36, of felt or like material, is inserted between it and its supporting rim or flange 32 so as to insure a substantially dust and moisture-tight joint therebetween. For reasons which will become apparent hereinafter, it is not necessary that the opening in the rear wall of the housing be as effectively sealed as that in the front wall of the housing so that it is necessary only to mount the rear panel 31 in such manner that it has a relatively tight engagement with its supporting flange or rim 33. Overhanging roof portions 23 and 24 serve to prevent drainage of water, from accumulation of rain water, snow or ice on the roof of the housing, directly down the rear and front respectively of the housing with the possibility of leakage of such water through the joints between the rear and front panels and their respective supporting flanges.

Rigidly secured on each side of the housing are hanger brackets 37 provided with apertures 38 adapted to be engaged by lift hooks of hoisting equipment in the installation of the housing. Strong metal bars 40 are firmly secured to the panel or back plate 31 in any suitable manner, as by means of angle irons 41 welded to the bars and to the back plate, and the bars are bent over at their upper ends as indicated at 42 to provide suspension hooks for the mounting of the housing on a cross arm of a pole and cross arm structure or the like, the bars being spaced from the back plate by means of the angle irons 41. The bars may, however, if desired, be secured directly to the housing or a portion of its framework structure.

The interior of the housing is separated into two compartments 43 and 44, at the front and rear respectively of the housing, by means of an apertured sheet metal partition 45. The partition member is secured firmly to the front of the framework previously described and the periphery of the partition is in relatively tight engagement with the top, side and bottom walls of the housing so as to provide a substantially dust and moisture-tight joint therebetween and, with the exception of the apertures in the partition, effectively isolates the compartment 43 from the compartment 44.

Compartment 44, which is toward the rear of the housing, is adapted to serve as an enclosure for a plurality of capacitor units 46 and also, in accordance with common practice, a plurality of discharge coils or resistors such as indicated at 47. The number of capacitor units and discharge devices is determined, of course, by the ratings of the individual units and the total capacity desired. It is contemplated that in the practice of the present invention, the housing may be constructed and adapted to accommodate various types of capacitor units, but in the exemplary embodiment illustrated it is particularly adapted to accommodate capacitor units constructed in accordance with the teachings of the copending application of M. E. Scoville, Serial No. 92,620, filed July 25, 1936 and assigned to the assignee of the present invention. Such capacitor units have metal enclosing casings, rectangular in shape, with two opposite side walls of the casings of substantially greater area than the other two opposite side walls thereof, the internal assembly of the units being such as to produce a greater heat dissipation per unit area from the broader sides of the casings than from the narrower sides of the casings. Projecting from the tops of the capacitor unit casings are connection terminals 48 which are supported by insulators or bushings 49. Also, the discharge coils or resistors 47 may assume various forms but, for purposes of illustration, they are shown as being of the type having substantially cylindrical metal casings with insulators or bushings 50 projecting from the tops thereof and carrying terminal conductors 51.

In the exemplary form of equipment illustrated, the angle iron cross members 13 and the cross members 14 are employed for supporting the capacitor units 46 and the discharge devices 47 respectively, it being understood, however, that in the practice of the present invention various other forms and arrangements of supporting means may be employed if desired for mounting the capacitor units and discharge devices in the compartment 44. As illustrated, the two vertically spaced apart rows of cross members 13, extending between and secured to cross members 11, are arranged in pairs with the individual members of the respective pairs horizontally spaced apart and arranged, as best shown in Fig. 3, to provide shelves or seats for receiving one of the narrower sides of a capacitor unit so as to support the capacitor unit with its broad sides extending vertically and with the terminal supporting top of the unit adjacent partition 45. The pairs of members 13 are arranged also so that each capacitor unit in the upper of the rows is substantially immediately above a unit in the subjacent row as shown in Fig. 2. This arrangement provides for a space between the bottoms of the units of the upper row and the tops of the units of the subjacent row and also provides substantially vertically extending chimney-like spaces between the broad sides of those of the units which are in adjacent horizontally spaced apart relationship. For holding the capacitor unit casings firmly in place during transportation or installation of the equipment and in order that the tops of the casings may be held firmly against the partition 45, clamping devices are provided comprising bars 52 held tightly in engagement with the bottoms of the casings by means of bolts 53 extending into screwthreaded engagement with the partition. With the tops of the casings disposed against the partition, the insulator supporting bushings 49 extend through apertures 54 provided therefor in the partition. Between the tops of the casings and the partition and surrounding the bushings 49, there are inserted gaskets 55 of suitable material, such for example as felt, which are effective, upon the drawing of the capacitor unit casings firmly into engagement with the partition by means of the clamping bars 52 and bolts 53, to seal the apertures 54 around the bushings.

Discharge devices 47 are mounted on the upper cross members 14 and secured firmly thereto by means of screw bolts 56, the devices being mounted in such manner that the bushings 50 thereof extend horizontally through apertures 57 provided therefor in the partition 45. Apertures 57 around the bushings 50 art sealed by means of gaskets 58 of felt or other suitable material.

The arrangement of compartment 44 and of the capacitor units 46 and discharge devices 47 therein is such that upon radiation of heat from the metal casings of the said units and devices during operation thereof, a circulation or air is induced inwardly through the screened opening 18 in the bottom of the housing, upwardly through the compartment over the broad sides of the capacitor unit casings, which broad sides have maximum heat dissipation per unit area as previously pointed out, and thence over the casings of the discharge devices and outwardly through duct 20, screened openings 26 and the underneath side of hood 25 as indicated by the arrows in Fig. 1. Thus efficient removal of heat from the capacitor units and discharge devices and adequate cooling thereof is secured. Hood 25 protects the interior of compartment 44 from adverse weather conditions while the screens 26 and 27, in the hood 25 and the opening 18 respectively, prevent the entrance of insects into the compartment. Under these circumstances, the outer surfaces of the casings of the capacitor units and discharge devices are kept clean so that they most effectively radiate the heat generated therein during operation of the apparatus.

In openings provided in the roof portion 21 of the housing are mounted entrance bushings 60 which serve to support external connection terminals 61 and terminal lugs 62. The bushings 60 and terminals 61 extend into the compartment 43 and the openings in the roof through which the bushings pass are effectively sealed by means of gaskets 63 of felt or other suitable material.

By removal of panel 30, compartment 43 is rendered readily accessible through the opening in the front of the housing for the making of electric connections between the terminals 48 of the capacitor units 46, the terminal leads 51 of the discharge devices 47 and the external connection terminals 61, in any desired manner, the details of the particular scheme of connections employed being immaterial in the practice of the present invention. Where, as in the illustrated embodiment, the capacitor units are divided into groups of parallel connected units, the interconnecting oil the units of a group may be accomplished by means of busbar strips such as those indicated at 65, which may be supported on the screw-threaded capacitor unit terminals 48 and secured in place by means of nuts 66 or other suitable means. The connection of the busbars to the terminals 61 by means of electric cables such as those indicated at 67, and of the discharge devices to the terminals 61 by means of their terminal conductors 51, may then be accomplished in accordance with the particular scheme of electric connections employed. It is desirable at points where any of the electric cables 67 cross in proximity to the busbars 65, to surround these cables with tubular shields 68 of insulation material which prevent contact of the cables with the busbars. The grounding of the casings of the capacitor units 46 may be accomplished in the rear compartment 44 by means of cables 70 which may be connected to the cross members 11 or to any other elements in conductive relation with the metal housing, and the housing may be connected to ground by means of a cable (not shown) fastened to the ground terminal lug 71 mounted upon the lower end of one of the suspension bars 40. Line connections may be made to the external terminals 61 by means of cables or conductors (not shown) fastened to the lugs 62.

From the foregoing description it will be seen that, while provision is made for most effective circulation of air through compartment 44 to cool the body of the capacitor, comprising the plurality of individual capacitor units 46 and the discharge devices 47, provision is made also for isolation of the terminals of the capacitor units with their supporting bushings and all the electric connections and live parts in the compartment 43. When all the elements of the equipment are in their final assembled form for outdoor installation, compartment 43 is substantially dust and moisture-tight due to the relatively close fitting joints between the partition 45 and the walls of the housing in engagement therewith and due to the sealing gaskets 36, 55, 58 and 63. Therefore, with equipment constructed and arranged in accordance with the present invention, it is impossible for insects or dust, fog and debris ladened air to gain access to the compartment 43 to produce arcing over of the bushings 49 and 50 and of the inner ends of bushings 60 or to form contaminating deposits upon the bushings and electric connections. Yet the making of connections in compartment 43 and the installation of the electric apparatus in compartment 44 and subsequent servicing of the apparatus within the housing is rendered quite easy due to the ready removability of panels or doors 30 and 31. Also screens 26 and 27 and hood 25 provide protection for the compartment 44 to prevent entrance thereinto of insects and relatively large sized particles of debris or of rain, snow and sleet which might damage or impair the efficiency of operation of electric apparatus disposed in this last mentioned compartment.

It will be evident also from the foregoing description that the housing is adapted for ready mounting upon a suitable supporting structure and that due to its sturdy and compact construction it will withstand weathering and any stresses to which it might be subjected during outdoor service.

It may be found desirable under some circumstances to construct the enclosing housing of the capacitor equipment in such manner that the side walls, as well as the front and rear walls may be removable from the framework structure. Such a construction is contemplated in the modified embodiment illustrated in Fig. 3 wherein the housing, generally designated 75, is provided with side walls 76 and 77 which may be constructed as individually removable elements of the housing or formed as integral parts of a U-shaped structure including also the removable rear wall panel of the housing. In either case, the side walls are secured to the framework in a suitable manner, as by means of wing screws 34 similar to those employed for mounting the front panel 30, and preferably are provided with handles 79 for aid in mounting or removing the side walls.

The housing may be provided also with a different form of roof construction such as that illustrated in Fig. 3 wherein the slant of the roof is toward the sides instead of toward the front and rear thereof and there is no air outlet duct or hood mounted upon top of the roof structure. In such case provision is made for the exhaust of air from the top of the housing by extending the roof outwardly at the sides of the housing as indicated at 80 and 81. These side extensions are formed with depending flanges or skirts 82 and 83 respectively, which serve to shield openings 84, provided in the upper portions of the side walls of the housing for the passage of air from the housing, and the openings 85 in the bottoms of the roof extensions from entrance of rain, sleet and snow thereinto. Openings 85 are screened as indicated at 86 to prevent entrance of insects therethrough into the housing.

In a manner similar to that described in connection with the embodiment illustrated in Figs. 1 and 2 air flows inwardly through the screened opening 18 in the bottom of the housing, upwardly along the broad sides of the casings of the capacitor units 46, over the casings of the discharge devices 47 and thence outwardly through openings 84 and screened openings 85 as indicated by the arrows in Fig. 3.

From the foregoing description, it will be readily understood that the present invention is not limited to the exemplary forms of equipment illustrated and described and that features of the invention are susceptible of modification or employment with equal advantages in other applications. Such modifications and other applications as do not depart from the true spirit and scope of the present invention are intended therefore to be covered by the appended claims.

What I claim as new and desire to secure by Letters Patent in the United States is:

1. In a capacitor equipment, an enclosing protective housing of rigid box-like construction including a partition defining two separate compartments within the housing, a plurality of individual casing enclosed capacitor units each having insulator carried terminals, means supporting said units in one of said compartments with the units in spaced relationship for circulation of air around the respective casings of the units and with the insulator carried terminals of the units projecting respectively through apertures in said partition into the other of said compartments, insulator carried terminals supported by said housing and extending through a wall of the housing into said other compartment, said last terminals provided with means external of the housing for connection with an external circuit, connection means in said other compartment between said housing supported terminals and the terminals of said capacitor units, ventilation openings in the falls of said one compartment operative to provide for circulation of air between and around the respective casings of said units in said one compartment, and means sealing said partition apertures around said capacitor unit terminals and otherwise sealing said other compartment against entrance thereinto and contamination of said terminals and connection means by dust, moisture, and other debris laden air.

2. An enclosing protective housing for capacitor equipment, comprising a substantially rectangular box-like structure having top, bottom and side walls and including a substantially vertical partition dividing the interior of the housing into two separate compartments, said partition having apertures for projection therethrough of insulator carried terminals of capacitor units supported in one of said compartments, supporting means in said one compartment for supporting a plurality of individual casing enclosed substantially horizontal capacitor units in rigid spaced apart relationship with insulator carried terminals of the respective units projecting substantially horizontally through apertures in said partition into the other of said compartments, insulator carried terminals supported by said housing and extending exteriorly of the housing for connection with an external circuit and extending into said other compartment for electric connection with capacitor unit terminals projecting through said partition apertures, ventilation openings respectively adjacent the top and bottom of the housing in communication with said one compartment for creating circulation of air upwardly through said one compartment over capacitor unit casings therein, and means for sealing said other compartment against entrance of moisture and debris laden air thereinto when terminals of capacitor units supported in said one compartment project through said partition apertures into said other compartment.

JOHN D. STACY.

---

CERTIFICATE OF CORRECTION.

Patent No. 2,158,868.   May 16, 1939.

JOHN D. STACY.

It is hereby certified that error appears in the printed specification of the above numbered patent requiring correction as follows: Page 3, first column, line 23, for the word "art" read are; line 71, for "oil" read of; page 4, second column, line 15, claim 1, for the word "falls" read walls; and that the said Letters Patent should be read with this correction therein that the same may conform to the record of the case in the Patent Office.

Signed and sealed this 11th day of July, A. D. 1939.

Henry Van Arsdale

Acting Commissioner of Patents.

(Seal)